(12) United States Patent
Ohnuki

(10) Patent No.: US 9,464,709 B2
(45) Date of Patent: Oct. 11, 2016

(54) TRANSMISSION

(71) Applicant: HONDA MOTOR CO., LTD., Tokyo (JP)

(72) Inventor: Motonori Ohnuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 23 days.

(21) Appl. No.: 14/595,211

(22) Filed: Jan. 13, 2015

(65) Prior Publication Data
US 2015/0204438 A1    Jul. 23, 2015

(30) Foreign Application Priority Data

Jan. 23, 2014    (JP) ................................ 2014-010840

(51) Int. Cl.
| | |
|---|---|
| *F16H 3/44* | (2006.01) |
| *F16D 11/06* | (2006.01) |
| *F16D 15/00* | (2006.01) |
| *F16H 57/10* | (2006.01) |
| *F16H 3/66* | (2006.01) |

(52) U.S. Cl.
CPC ............... *F16H 57/10* (2013.01); *F16H 3/66* (2013.01); *F16H 2200/2012* (2013.01); *F16H 2200/2046* (2013.01); *F16H 2200/2066* (2013.01); *F16H 2200/2082* (2013.01)

(58) Field of Classification Search
CPC .......................... F16H 3/00; F16H 2200/2005
See application file for complete search history.

(56) References Cited

U.S. PATENT DOCUMENTS

| | | | | |
|---|---|---|---|---|
| 7,029,417 B2* | 4/2006 | Borgerson | ................ | F16H 3/66 475/275 |
| 7,972,236 B2* | 7/2011 | Hiraki | .................... | B60K 6/445 475/286 |
| 8,622,186 B2* | 1/2014 | Samie | ..................... | F16H 57/08 192/43.1 |

FOREIGN PATENT DOCUMENTS

| | | | | |
|---|---|---|---|---|
| CN | 102486210 | | 6/2012 | |
| CN | 103216586 | | 7/2013 | |
| EP | 0388209 | A2 * | 9/1990 | ............... F16H 3/66 |
| JP | 2013-194825 | | 9/2013 | |

OTHER PUBLICATIONS

Chinese Office Action for corresponding CN Application No. 201510013140.7, Aug. 2, 2016 (w/ English machine translation).

* cited by examiner

*Primary Examiner* — Tisha Lewis
(74) *Attorney, Agent, or Firm* — Mori & Ward, LLP

(57) ABSTRACT

A transmission includes a transmission mechanism. The transmission mechanism includes a planetary gear mechanism and a fixing element. A ring gear is provided with a first gear meshing with an output gear on an output member and a second gear meshing with a plurality of pinion gears. The output gear and the first gear include helical gears meshing with each other. The second gear and the plurality of pinion gears include helical gears meshing with each other. Helix angles of the output gear and the first gear and helix angles of the second gear and the plurality of pinion gears are set so that a thrust force generated in a case where the output gear and the first gear rotate and a thrust force generated in a case where the second gear and the plurality of pinion gears rotate are directed towards each other.

10 Claims, 5 Drawing Sheets

TRANSMISSION

CROSS-REFERENCE TO RELATED APPLICATIONS

The present application claims priority under 35 U.S.C. §119 to Japanese Patent Application No. 2014-010840, filed Jan. 23, 2014, entitled "Transmission." The contents of this application are incorporated herein by reference in their entirety.

BACKGROUND

1. Field

The disclosure relates to a transmission.

2. Description of the Related Art

Hitherto, there are transmissions that are provided with a transmission mechanism that changes a speed of rotation generated by a driving force input from a driving source and that outputs the rotation to an output member. As such transmissions, for example, Japanese Unexamined Patent Application Publication No. 2013-194825 illustrates a transmission that, after changing a speed of rotation of an input shaft into a plurality of levels through a plurality of planetary gear mechanisms, outputs the rotation from an output member.

SUMMARY

According to one aspect of the present invention, a transmission provided with a transmission mechanism that changes a speed of rotation generated by a driving force input from a driving source and that outputs the rotation to an output member includes the transmission mechanism. The transmission mechanism includes a planetary gear mechanism and a fixing element. The planetary gear mechanism includes a sun gear, a ring gear, a carrier, and a plurality of pinion gears. The plurality of pinion gears are rotatably supported by the carrier and are meshed with the sun gear and the ring gear. The fixing element switches the carrier between a state in which the carrier is allowed to relatively rotate with respect to a member on a fixation side and a state in which the carrier is fixed with respect to the member on the fixation side. The ring gear is integrally provided with a first gear that meshes with an output gear on the output member and a second gear that meshes with the pinion gears. The output gear and the first gear are constituted by helical gears that mesh with each other. The second gear and the pinion gears are constituted by helical gears that mesh with each other. Helix angles of the output gear and the first gear and helix angles of the second gear and the pinion gears are set so that a thrust force generated when the output gear and the first gear rotate and a thrust force generated when the second gear and the pinion gears rotate are directed towards each other. A first meshing point where the output gear and the first gear mesh with each other and a second meshing point where the second gear and one of the pinion gears mesh with each other are arranged on a straight line that connects a rotation center of the output member and a rotation center of the planetary gear mechanism when the carrier is fixed with the fixing element.

According to another aspect of the present invention, a transmission includes a transmission mechanism. The transmission mechanism is to change a speed of rotation generated by a driving force input from a driving source and to output the rotation to an output member. The transmission mechanism includes a planetary gear mechanism and a fixing element. The planetary gear mechanism includes a sun gear, a ring gear, a carrier, and a plurality of pinion gears. The plurality of pinion gears are rotatably supported by the carrier and are meshed with the sun gear and the ring gear. The ring gear is provided with a first gear meshing with an output gear on the output member and a second gear meshing with the plurality of pinion gears. The output gear and the first gear include helical gears meshing with each other. The second gear and the plurality of pinion gears include helical gears meshing with each other. Helix angles of the output gear and the first gear and helix angles of the second gear and the plurality of pinion gears are set so that a thrust force generated in a case where the output gear and the first gear rotate and a thrust force generated in a case where the second gear and the plurality of pinion gears rotate are directed towards each other. The fixing element is to switch the carrier between a state in which the carrier is allowed to relatively rotate with respect to a member on a fixation side and a state in which the carrier is fixed with respect to the member on the fixation side. A first meshing point where the output gear and the first gear mesh with each other and a second meshing point where the second gear and one of the plurality of pinion gears mesh with each other are arranged on a straight line connecting a rotation center of the output member and a rotation center of the planetary gear mechanism in a case where the carrier is fixed with the fixing element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 4A and 4B are drawings for describing an arrangement of fixation mechanisms that fix a carrier of the second planetary gear mechanism to a casing, in which FIG. 4A is a lateral cross-sectional view of the carrier and the fixation mechanisms and FIG. 4B is a schematic diagram of the second planetary gear mechanism and a counter gear viewed from the axial direction.

DESCRIPTION OF THE EMBODIMENTS

Figure 1:
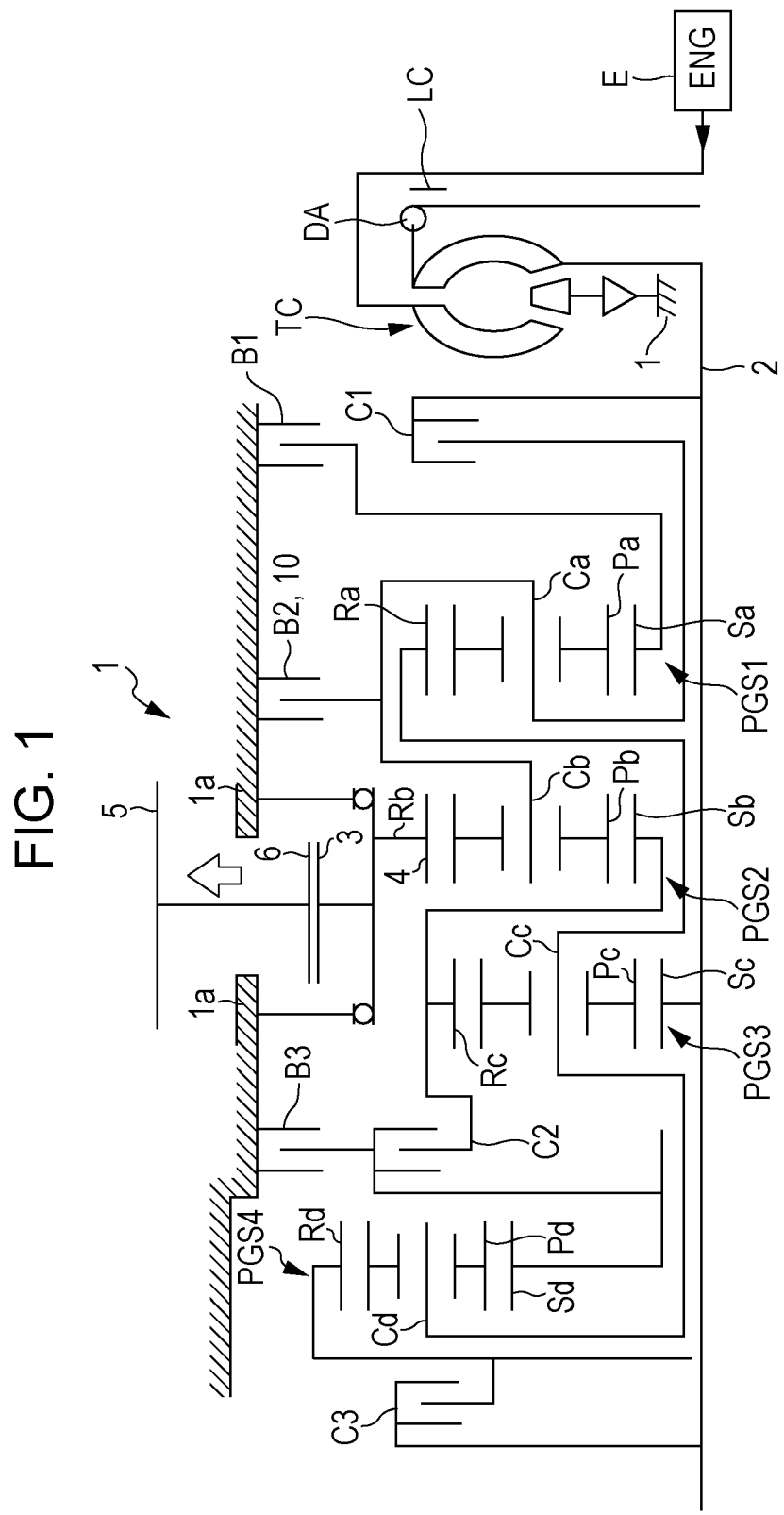
FIG. 1 is a skeleton diagram of a transmission according to an exemplary embodiment of the disclosure.

The embodiments will now be described with reference to the accompanying drawings, wherein like reference numerals designate corresponding or identical elements throughout the various drawings.

Hereinafter, an exemplary embodiment of the disclosure will be described in detail with reference to the accompanying drawings. FIG. 1 is a skeleton diagram of an automatic transmission according to an exemplary embodiment of the disclosure. An automatic transmission 1 illustrated in FIG. 1 includes an input shaft 2 that is pivotally supported in a transmission case 1a in a rotatable manner, the driving force that an engine (an internal-combustion engine) E serving as a driving force outputs being transmitted to the input shaft 2 through a torque converter TC that includes a lockup clutch LC and a damper DA, and a counter shaft (an output member) 5 arranged concentrically with the input shaft 2.

The rotation of the counter shaft 5 is transmitted to left and right driving wheels of a vehicle through a differential gear or a propeller shaft (not shown). Note that a single-plate or a multiple-plate start clutch that is configured in a frictionally engaged manner may be provided in place of the torque converter TC.

In the transmission case 1*a*, four first to fourth planetary gear mechanisms PGS1 to PGS4 are disposed concentrically with the input shaft 2. The first planetary gear mechanism PGS1 is a so-called single pinion planetary gear mechanism including a carrier Ca that allows a sun gear Sa, a ring gear Ra, and pinions Pa that mesh with the sun gear Sa and the ring gear Ra to rotate and revolve while pivotally supporting the sun gear Sa, the ring gear Ra, and the pinions Pa. In the first planetary gear mechanism PGS1, when the sun gear Sa is rotated while the carrier Ca is fixed, the ring gear Ra rotates in a direction different from the rotating direction of the sun gear Sa. Note that when the sun gear Sa is rotated while the ring gear Ra is fixed, the carrier Ca rotates in a direction that is the same as the rotating direction of the sun gear Sa.

The second planetary gear mechanism PGS2 is also a so-called single pinion planetary gear mechanism including a carrier Cb that allows a sun gear Sb, a ring gear Rb, and pinions Pb that mesh with the sun gear Sb and the ring gear Rb to rotate and revolve while pivotally supporting the sun gear Sb, the ring gear Rb, and the pinions Pb.

The third planetary gear mechanism PGS3 is also a so-called single pinion planetary gear mechanism including a carrier Cc that allows a sun gear Sc coupled to the input shaft 2, a ring gear Rc, and pinions Pc that mesh with the sun gear Sc and the ring gear Rc to rotate and revolve while pivotally supporting the sun gear Sc, the ring gear Rc, and the pinions Pc.

The fourth planetary gear mechanism PGS4 is also a so-called single pinion planetary gear mechanism including a carrier Cd that allows a sun gear Sd, a ring gear Rd, and pinions Pd that mesh with the sun gear Sd and the ring gear Rd to rotate and revolve while pivotally supporting the sun gear Sd, the ring gear Rd, and the pinions Pd.

Furthermore, a first coupling body Cc-Ra-Cd is formed by coupling the carrier Cc of the third planetary gear mechanism PGS3, the ring gear Ra of the first planetary gear mechanism PGS1, and the carrier Cd of the fourth planetary gear mechanism PGS4. Furthermore, a second coupling body Rc-Sb is formed by coupling the ring gear Rc of the third planetary gear mechanism PGS3 and the sun gear Sb of the second planetary gear mechanism PGS2. Furthermore, a third coupling body Ca-Cb is formed by coupling the carrier Ca of the first planetary gear mechanism PGS1 and the carrier Cb of the second planetary gear mechanism PGS2.

Furthermore, the automatic transmission 1 of the present exemplary embodiment includes six coupling mechanisms constituted by three clutches, namely, first to third clutches C1 to C3, and three brakes, namely, first to third brakes B1 to B3.

The first clutch C1 is a hydraulically actuated multiplate wet clutch and is configured so as to be switchable between a coupled state in which the sun gear Sc of the third planetary gear mechanism PGS3 and the third coupling body Ca-Cb are connected to each other and a released state in which the connection is cutoff.

The second clutch C2 is a hydraulically actuated multi-plate wet clutch and is configured so as to be switchable between a coupled state in which the sun gear Sd of the fourth planetary gear mechanism PGS4 and the second coupling body Rc-Sb are connected to each other and a released state in which the connection is cutoff.

The third clutch C3 is a hydraulically actuated multiplate wet clutch and is configured so as to be switchable between a coupled state in which the sun gear Sc of the third planetary gear mechanism PGS3 and the ring gear Rd of the fourth planetary gear mechanism PGS4 are connected to each other and a released state in which the connection is cutoff.

The first brake B1 is a hydraulically actuated multiple wet-disc brake and is configured so as to be switchable between a fixed state in which the sun gear Sa of the first planetary gear mechanism PGS1 is fixed to the transmission case 1*a* and a released state in which the fixation is released. Note that the first brake B1 may be constituted by a two-way clutch.

The second brake (the fixing element) B2 includes mechanical fixation mechanisms 10 (see FIGS. 4A and 4B) that prevent the third coupling body Ca-Cb from rotating in a normal direction and that permit the third coupling body Ca-Cb to rotate in a reverse direction. In other words, the second brake B2 that includes the fixation mechanisms 10 is brought into a locked state that prevents the third coupling body Ca-Cb from rotating and that fixes the third coupling body Ca-Cb to the transmission case 1*a* when a force that rotates the third coupling body Ca-Cb in the normal direction is applied and is brought into a released state that permits rotation of the third coupling body Ca-Cb when a force that rotates the third coupling body Ca-Cb in the reverse direction is applied. Configurations of the fixation mechanisms 10 that are included in the second brake B2 will be described in detail below.

Note that the second brake B2 may be constituted by a one-way clutch that prevents normal rotation of the third coupling body Ca-Cb and that permits reverse rotation thereof.

The third brake B3 is a hydraulically actuated multiple wet-disc brake and is configured so as to be switchable between a fixed state in which the sun gear Sd of the fourth planetary gear mechanism PGS4 is fixed to the transmission case 1*a* and a released state in which the fixation is released.

The states of each of the clutches C1 to C3, the first brake B1, and the third brake B3 are switched on the basis of vehicle information, such as the traveling speed of the vehicle, with a transmission control unit (not shown).

The first clutch C1, the first planetary gear mechanism PGS1, the second planetary gear mechanism PGS2, the third planetary gear mechanism PGS3, the second clutch C2, the fourth planetary gear mechanism PGS4, and the third clutch C3 are arranged along the axis line of the input shaft 2 in this order from the engine E and the torque converter TC side.

An external gear (a first gear) 3 that meshes with a counter gear (an output gear) 6 on a counter shaft (an output member) 5 and an internal gear (a second gear) 4 that meshes with pinion gears Pb are provided in an integral manner in the ring gear Rb of the second planetary gear mechanism PGS2. The external gear 3 is formed in the outer peripheral surface of the ring gear Rb and the internal gear 4 is formed in the inner peripheral surface of the ring gear Rb.

Figure 2:
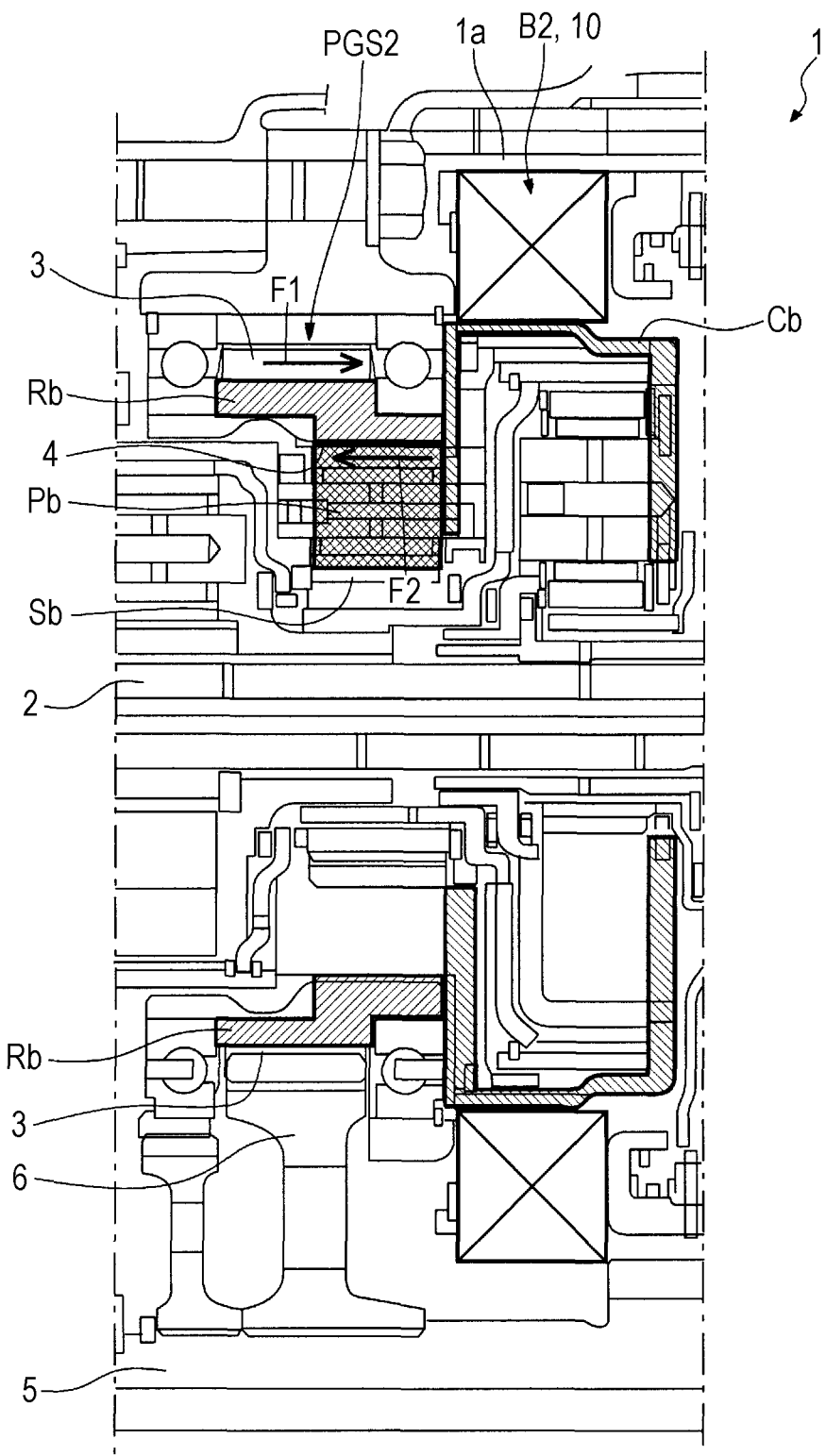
FIG. 2 is a partial lateral cross-sectional view illustrating a portion of an automatic transmission.

Furthermore, the counter gear 6 on the counter shaft 5 and the external gear 3 on the ring gear Rb that mesh with each other are helical gears. Moreover, the internal gear 4 on the ring gear Rb and the pinion gears Pb that mesh with each other are helical gears. As illustrated in FIG. 2, the helix angles of the counter gear 6 and the external gear 3 (the helix angles of the helical gears) and the helix angles of the internal gear 4 and the pinion gears Pb (the helix angles of the helical gears) are set so that a thrust force (a load in the axial direction) F1 that is generated in the ring gear Rb when the meshed counter gear 6 and external gear 3 are rotated and a thrust force (a load in the axial direction) F2 that is generated in the ring gear Rb when the meshed internal gear 4 and the pinion gears Pb are rotated are directed towards each other (directed so as to counter each other in the axial direction).

Figure 3:
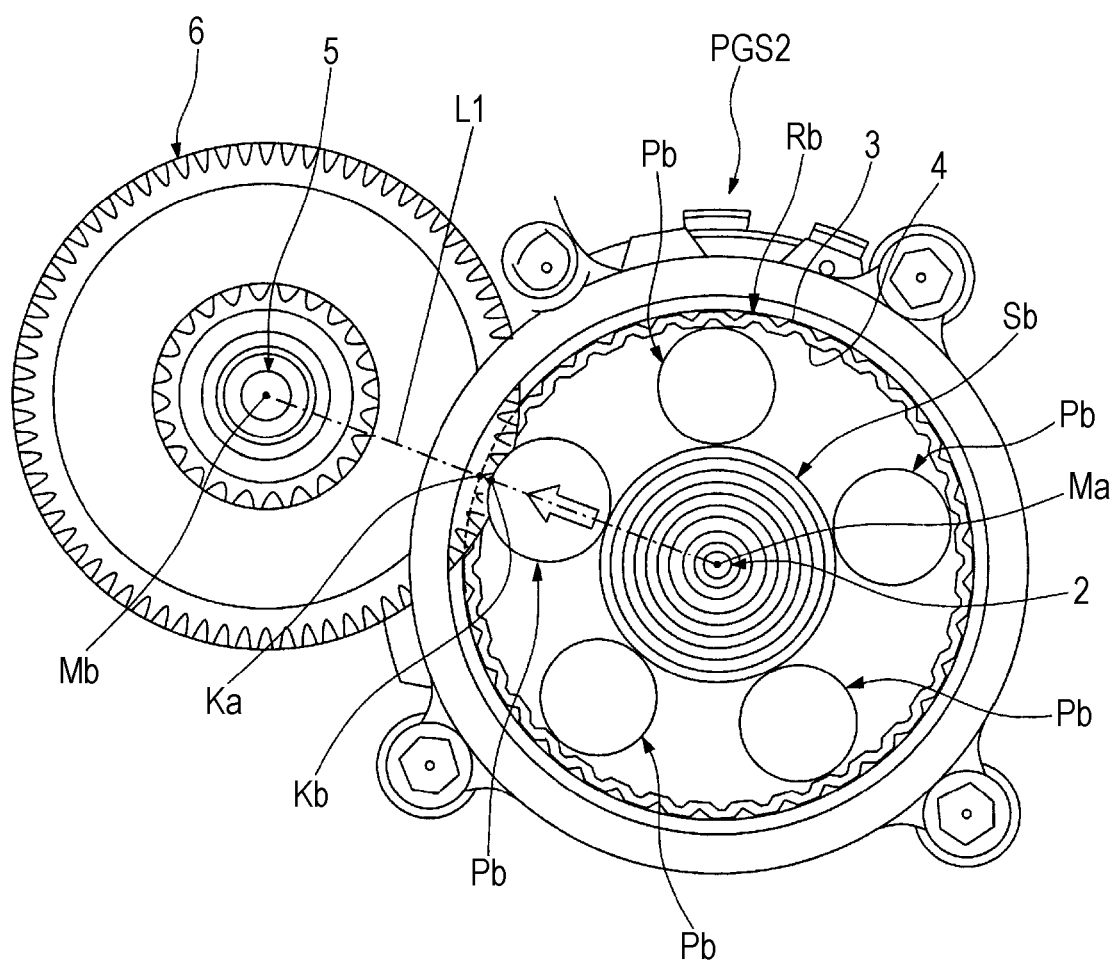
FIG. 3 is a schematic diagram of components of a second planetary gear mechanism and a counter gear on the counter shaft seen from an axial direction.

FIG. 2 is a lateral partial sectional view illustrating a portion of the automatic transmission 1 in an enlarged manner. Furthermore, FIG. 3 is a schematic diagram of the components of the second planetary gear mechanism PGS2 and the counter gear 6 on the counter shaft 5 seen from the axial direction. As illustrated in FIG. 3, a meshing point (a first meshing point) Ka where the counter gear 6 on the counter shaft 5 and the external gear 3 of the ring gear Rb mesh with each other and a meshing point (a second meshing point) Kb where the internal gear 4 of the ring gear Rb and a pinion gear Pb mesh with each other are arranged on a straight line L1 that connects a rotation center Mb of the counter gear 6 (a shaft center of the counter shaft 5) and a rotation center Ma of the second planetary gear mechanism PGS2 (a shaft center of the input shaft 2) to one another. Note that the positions of the above-described meshing point Ka and meshing point Kb in the axial direction do not have to be the same and may be arranged at different positions with respect to each other as long as the positions of the meshing point Ka and the meshing point Kb in the circumferential direction (the rotating direction) are arranged on the straight line L1 when seen from the axial direction.

Figure 4A:
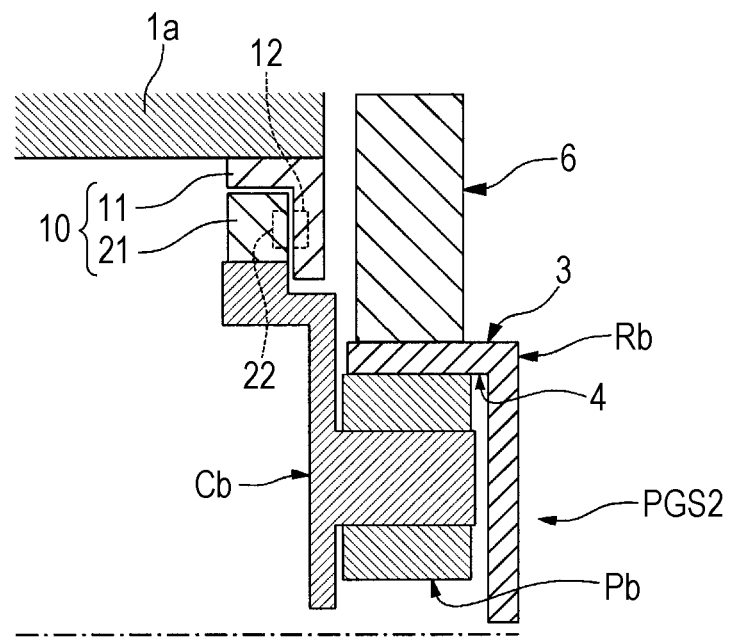
Figure 4B:
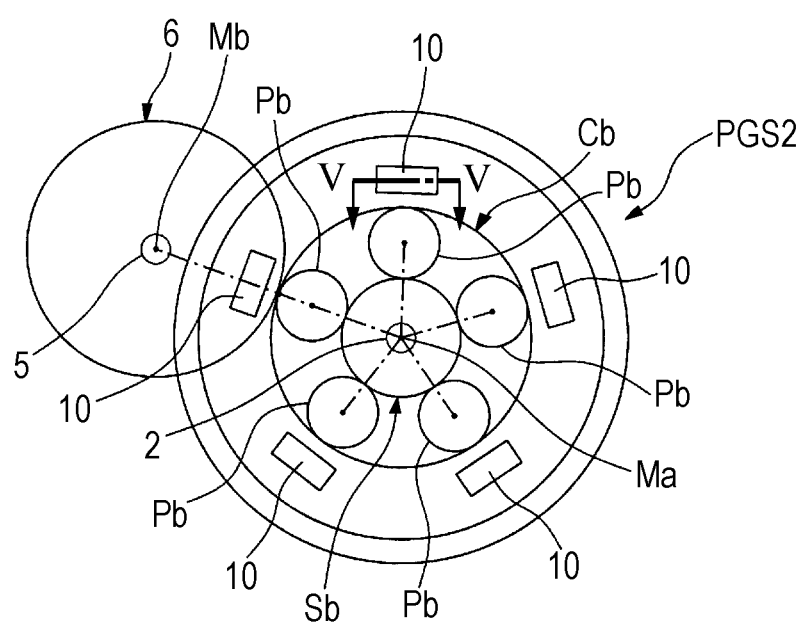

FIGS. 4A and 4B are drawings for describing an arrangement of the fixation mechanisms 10 that fix the carrier Cb of the second planetary gear mechanism PGS2 to the transmission case 1a, in which FIG. 4A is a lateral cross-sectional view of the carrier Cb and the fixation mechanisms 10 and FIG. 4B is a schematic diagram of the second planetary gear mechanism PGS2 and the counter gear 6 viewed from the axial direction. Five pinion gears Pb that are supported by the carrier Cb of the second planetary gear mechanism PGS2 are provided around the outer peripheries of the input shaft 2 and the sun gear Sb at equal intervals in the circumferential direction. Moreover, the fixation mechanisms (fixing elements) 10 that is included in the second brake B2 described above are provided between the transmission case (a member on a fixation side) 1a and the carrier Cb of the second planetary gear mechanism PGS2. The fixation mechanisms 10 are mechanisms for fixing the carrier Cb of the second planetary gear mechanism PGS2 to the transmission case 1a and are provided around the outer peripheries of the input shaft 2 and the sun gear Sb at equal intervals in the circumferential direction.

Figure 5:
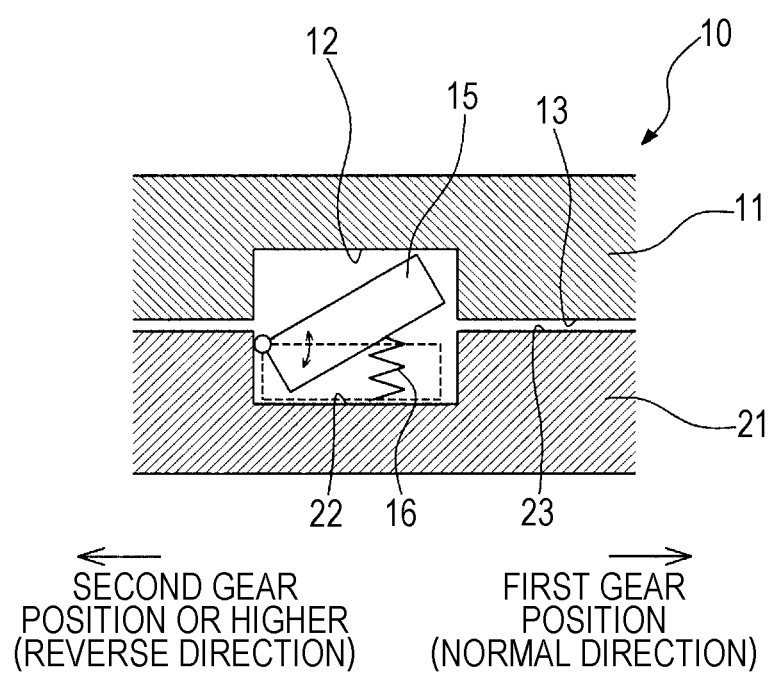
FIG. 5 illustrates a cross-section taken along arrow line V-V of FIG. 4B and is a diagram for describing a configuration of the fixation mechanism.

FIG. 5 illustrates a cross-section taken along arrow line V-V of FIG. 4B and is a diagram for describing the configuration of the fixation mechanism 10. The fixation mechanisms 10 include a substantially toric first component 11 that is fixed to the inner peripheral side of the transmission case 1a by spline fitting and a substantially toric second component 21 that is fixed to the outer peripheral side of the carrier Cb by spline fitting. The first component 11 and the second component 21 are disposed so that the inner portion of the first component 11 and the outer portion of the second component 21 in the radial direction face each other and are disposed such that the first component 11 surrounds the outer peripheral surface and one of the lateral sides of the second component 21.

Furthermore, each fixation mechanism 10 includes a first groove portion 12 that is provided in a surface (a first surface) 13 of the first component 11 that is oriented towards the second component 21 side and a second groove portion 22 that is provided in a surface (a second surface) 23 of the second component 21 that is oriented towards the first surface 13 side. As can be understood from FIGS. 4A and 4B, five first groove portions 12 are provided in the first flat surface 13 of the first component 11 at equal intervals in the circumferential direction. Furthermore, one of the first groove portions 12 is disposed at a position that is the same as the position of the meshing point Ka between the counter gear 6 and the external gear 3 in the circumferential direction (the rotating direction). Furthermore, five second groove portions 22 are provided in the second flat surface 23 of the second component 21 at equal intervals in the circumferential direction. Each of the five second groove portions 22 is disposed at a position that is the same as the position of the corresponding one of the five pinion gears Pb in the circumferential direction (the rotating direction).

Furthermore, the fixation mechanisms 10 each include a strut (a block plate) 15 that is disposed inside the second groove portion 22, and a coil spring (a biasing element) 16 that biases the strut 15 in a direction that protrudes the strut 15 into the first groove portion 12 from the second groove portion 22. The strut 15 is configured so as to be pivotal (swingable) between a retracted position in which the strut 15 is received in the second groove portion 22 and a protruded position in which a portion of the distal end side of the strut 15 protrudes from the second groove portion 22. The coil spring 16 is disposed in a state that biases the strut 15 towards the protruded position.

Furthermore, in the fixation mechanism 10, when the carrier Cb and the second component 21 are about to rotate in one direction (the normal direction) with respect to the transmission case 1a and the first component 11, the strut 15 that has protruded from the second groove portion 22 engages with the first groove portion 12 and restricts relative rotation of the carrier Cb and the second component 21. On the other hand, when the carrier Cb and the second component 21 are about to rotate in the other direction (the reverse direction) with respect to the transmission case 1a and the first component 11, the strut 15 is received in the second groove portion 22 so as to permit rotation of the carrier Cb and the second component 21.

Moreover, when first gear position is set in the automatic transmission 1, the carrier Cb and the second component 21 are set to rotate in the normal direction described above relative to the transmission case 1a and the first component 11. Accordingly, in such a case, relative rotation between the first component 11 and the second component 21 is restricted and the carrier Cb is fixed to the transmission case 1a. On the other hand, when a second gear position or higher is set in the automatic transmission 1, the carrier Cb and the second component 21 are set to rotate in the reverse direction described above relative to the transmission case 1a and the first component 11. Accordingly, in such a case, a state (an idle state) is reached in which relative rotation between the first component 11 and the second component 21 is permitted.

Moreover, in the present exemplary embodiment, when the carrier Cb is fixed with the fixation mechanisms 10 described above, as illustrated in FIG. 3, the meshing point Ka between the counter gear 6 and the external gear 3 and the meshing point Kb between the internal gear 4 and one of the pinion gears Pb are arranged on the straight line L1 that connects the rotation center Mb of the counter gear 6 and the rotation center Ma of the second planetary gear mechanism PGS2.

Accordingly, when the carrier Cb is fixed with the fixation mechanisms 10, a thrust load (a load in the axial direction) generated in the meshing point Ka between the counter gear 6 and the external gear 3 can be canceled out with a thrust load generated in the meshing point Kb between the internal gear 4 and the pinion gear Pb. Accordingly, the displacement of the ring gear Rb of the second planetary gear mechanism PGS2 in the axial direction and the inclination of the ring gear Rb with respect to the axial direction can be reduced effectively and operation sounds associated with the rotation of the ring gear Rb can be reduced with a simple configuration.

In other words, the automatic transmission 1 of the present exemplary embodiment is configured so that the meshing point Ka between the counter gear 6 and the external gear 3 of the ring gear Rb matches (is at the same position in the circumferential direction) the meshing point Kb between the internal gear 4 of the ring gear Rb and one of the pinion gears Pb when the carrier Cb of the second planetary gear mechanism PGS2 is fixed; accordingly, the thrust force that the ring gear Rb receives from the counter gear 6 and the thrust force generated with the meshed pinion gear Pb and ring gear Rb are made to correspond to each other on the same line, and, thus, the thrust forces can be canceled out. Accordingly, tilting and inclination of the ring gear Rb can be reduced and deterioration of the operation sound associated with the rotation of the ring gear Rb can be suppressed.

Furthermore, in the automatic transmission 1 of the present exemplary embodiment, one of the first groove portions 12 that is included in the fixation mechanisms 10 is disposed at a position that is the same as the position of the meshing point Ka between the counter gear 6 and the external gear 3 in the rotating direction, and each of the five second groove portions 22 is disposed at a position that is the same as the position of the corresponding one of the five pinion gears Pb in the rotating direction; accordingly, when the carrier Cb is fixed by the fixation mechanisms 10, the meshing point Ka where the counter gear 6 and the external gear 3 mesh with each other and the meshing point Kb where the internal gear 4 and one of the pinion gears Pb mesh with each other are arranged on the straight line connecting the rotation center Ma of the second planetary gear mechanism PGS2 and the rotation center Mb of the counter gear 6. Accordingly, with a simple configuration, the thrust load (the load in the axial direction) generated in the meshing point Ka between the counter gear 6 and the external gear 3 can be canceled out with the thrust load generated in the meshing point Kb between the internal gear 4 and the pinion gear Pb.

Although an exemplary embodiment of the disclosure has been described above, the disclosure is not limited to the exemplary embodiment described above and various modifications can be made within the scope of the technical ideas that are described in the claims, the description, and the drawings. For example, the exemplary embodiment described above has illustrated a case in which the strut (an engagement element) and the coil spring (the biasing element) are disposed inside the second groove portion provided in the second member; however, the engagement element in the biasing element according to the disclosure may be disposed inside the first groove portion provided in the first member.

Furthermore, the fixation mechanisms (the fixing elements) 10 of the exemplary embodiment described above include five first groove portions 12 and five second groove portions 22; however, the number of the first groove portions and the number of the second groove portions included in the fixing elements according to the disclosure are not limited to the numbers illustrated in the exemplary embodiment described above and the numbers thereof may be different numbers.

A transmission according to the disclosure is a transmission provided with a transmission mechanism that changes a speed of rotation generated by a driving force input from a driving source and that outputs the rotation to an output member, the transmission including: the transmission mechanism including a planetary gear mechanism including a sun gear, a ring gear, a carrier, and a plurality of pinion gears, the plurality of pinion gears being rotatably supported by the carrier and being meshed with the sun gear and the ring gear, and a fixing element that switches the carrier between a state in which the carrier is allowed to relatively rotate with respect to a member on a fixation side and a state in which the carrier is fixed with respect to the member on the fixation side; the ring gear being integrally provided with a first gear that meshes with an output gear on the output member and a second gear that meshes with the pinion gears; the output gear and the first gear being constituted by helical gears that mesh with each other; the second gear and the pinion gears being constituted by helical gears that mesh with each other; helix angles of the output gear and the first gear and helix angles of the second gear and the pinion gears being set so that a thrust force generated when the output gear and the first gear rotate and a thrust force generated when the second gear and the pinion gears rotate are directed towards each other; and a first meshing point where the output gear and the first gear mesh with each other and a second meshing point where the second gear and one of the pinion gears mesh with each other being arranged on a straight line that connects a rotation center of the output member and a rotation center of the planetary gear mechanism when the carrier is fixed with the fixing element.

The transmission according to the disclosure is configured so that, when the carrier is fixed by the fixing element, the first meshing point where the output gear on the output member and the first gear of the ring gear mesh with each other and the second meshing point where the second gear of the ring gear and one of the pinion gears mesh with each other are arranged on a straight line that connects the rotation center of the output member and the rotation center of the planetary gear mechanism; accordingly, when the carrier is fixed by the fixing element, a thrust load (a load in the axial direction) generated in the meshing point between the output gear and the first gear can be canceled out with a thrust load generated in the meshing point between the second gear and the pinion gear. Accordingly, the displacement of the ring gear of the planetary gear mechanism in the axial direction and the inclination of the ring gear with respect to the axial direction can be reduced effectively and operation sounds associated with the rotation of the ring gear can be reduced with a simple configuration.

Furthermore, in the transmission described above, the fixing element may include a first member that is attached to the member on the fixation side, a second member that is attached to the carrier, a single or a plurality of first groove portions that are formed in a first surface of the first member, the first surface opposing the second member, a single or a plurality of second groove portions that are formed in a second surface of the second member, the second surface opposing the first surface, an engagement element that is received in the single or the plurality of first groove portions or the single or the plurality of second groove portions, and a biasing element that biases the engagement element in a direction that protrude the engagement element toward the single or the plurality of first groove portions or the single or the plurality of second groove portions. When the second member is about to relatively rotate in one direction with respect to the first member, the engagement element may engage with the single or the plurality of first groove portions or the single or the plurality of second groove portions so as to restrict relative rotation, and when the second member is about to relatively rotate in another direction with respect to the first member, the engagement element may be received in the single or the plurality of second groove portions or the single or the plurality of first groove portions so as to permit relative rotation. At least one of the single or the plurality of first groove portions may be disposed at a position that is the same as a position of the first meshing point in a rotating direction, and each of the single or the plurality of second groove portions may be disposed at a position that is the same as a position of a corresponding one of the plurality of pinion gears in the rotating direction.

According to the above configuration, engagement of the engagement element received in the single or the plurality of first groove portions or the single or the plurality of second groove portions of the fixing element to the single or the plurality of second groove portions or the single or the plurality of first groove portions restricts relative rotation between the first member and the second member such that the carrier is fixed. Moreover, while in a state in which the carrier is fixed, the meshing point between the output gear and the first gear and the meshing point between the second gear and one of the pinion gears can be arranged on a straight line that connects the rotation center of the planetary gear mechanism and the rotation center of the output member. Accordingly, with a simple configuration, the thrust load (the load in the axial direction) generated in the meshing point between the output gear and the first gear can be canceled out with the thrust load generated in the meshing point between the second gear and the pinion gear.

In other words, by arranging at least one of the single or the plurality of first groove portions included in the fixing element at a position that is the same as the position of the meshing point between the output gear and the second gear and by arranging each of the single or the plurality of second groove portions at a position that is the same as the positon of the corresponding one of the plurality of pinion gears, when the carrier is fixed by the fixing element, the first meshing point and the second meshing point can be arranged on a straight line that connects the rotation center of the planetary gear mechanism and the rotation center of the output member.

Note that the reference numerals in the parentheses described above illustrate the reference numerals of the components of the present exemplary embodiment described later as an example of the disclosure.

The transmission according to the disclosure is capable of, with a simple configuration, effectively reducing the displacement of the ring gear of the planetary gear mechanism in the axial direction and the inclination of the ring gear with respect to the axial direction and is capable of reducing the operation sound associated with the rotation of the ring gear.

Obviously, numerous modifications and variations of the present invention are possible in light of the above teachings. It is therefore to be understood that within the scope of the appended claims, the invention may be practiced otherwise than as specifically described herein.

What is claimed is:

1. A transmission provided with a transmission mechanism that changes a speed of rotation generated by a driving force input from a driving source and that outputs the rotation to an output member, the transmission comprising:
   the transmission mechanism including
      a planetary gear mechanism including a sun gear, a ring gear, a carrier, and a plurality of pinion gears, the plurality of pinion gears being rotatably supported by the carrier and being meshed with the sun gear and the ring gear, and
      a fixing element that switches the carrier between a state in which the carrier is allowed to relatively rotate with respect to a member on a fixation side and a state in which the carrier is fixed with respect to the member on the fixation side;
   the ring gear having a first gear that meshes with an output gear on the output member and a second gear that meshes with the pinion gears;
   the output gear and the first gear being constituted by helical gears that mesh with each other;
   the second gear and the pinion gears being constituted by helical gears that mesh with each other;
   helix angles of the output gear and the first gear and helix angles of the second gear and the pinion gears being set so that a thrust force generated when the output gear and the first gear rotate and a thrust force generated when the second gear and the pinion gears rotate are directed towards each other; and
   a first meshing point where the output gear and the first gear mesh with each other and a second meshing point where the second gear and one of the pinion gears mesh with each other being arranged on a straight line that connects a rotation center of the output member and a rotation center of the planetary gear mechanism due to the operation of the fixing element to fix the carrier.

2. The transmission according to claim 1, wherein
   the fixing element includes
      a first member that is attached to the member on the fixation side,
      a second member that is attached to the carrier,
      a single or a plurality of first groove portions that are formed in a first surface of the first member, the first surface opposing the second member,
      a single or a plurality of second groove portions that are formed in a second surface of the second member, the second surface opposing the first surface,
      an engagement element that is received in the single or the plurality of first groove portions or the single or the plurality of second groove portions, the engagement element having an end connected to the first member or to the second member, and
      a biasing element that biases the engagement element in a direction that protrude the engagement element toward the single or the plurality of first groove portions or the single or the plurality of second groove portions, the biasing element having a first end connected to the first member or the second member and a second end connected to the engagement element,
   when the second member is about to relatively rotate in one direction with respect to the first member, the engagement element engages with the single or the plurality of first groove portions or the single or the plurality of second groove portions so as to restrict relative rotation, when the second member is about to relatively rotate in another direction with respect to the first member, the engagement element is received in the single or the plurality of second groove portions or the single or the plurality of first groove portions so as to permit relative rotation, at least one of the single or the plurality of first groove portions is disposed at a position that is the same as a position of the first meshing point in a rotating direction, and each of the single or the plurality of second groove portions is disposed at a position that is the same as a position of a corresponding one of the plurality of pinion gears in the rotating direction.

3. A transmission comprising:

a transmission mechanism to change a speed of rotation generated by a driving force input from a driving source and to output the rotation to an output member, the transmission mechanism comprising:

a planetary gear mechanism including a sun gear, a ring gear, a carrier, and a plurality of pinion gears, the plurality of pinion gears being rotatably supported by the carrier and being meshed with the sun gear and the ring gear, the ring gear having a first gear meshing with an output gear on the output member and a second gear meshing with the plurality of pinion gears, the output gear and the first gear comprising helical gears meshing with each other, the second gear and the plurality of pinion gears comprising helical gears meshing with each other, helix angles of the output gear and the first gear and helix angles of the second gear and the plurality of pinion gears being set so that a thrust force generated in a case where the output gear and the first gear rotate and a thrust force generated in a case where the second gear and the plurality of pinion gears rotate are directed towards each other; and a fixing element to switch the carrier between a state in which the carrier is allowed to relatively rotate with respect to a member on a fixation side and a state in which the carrier is fixed with respect to the member on the fixation side, a first meshing point where the output gear and the first gear mesh with each other and a second meshing point where the second gear and one of the plurality of pinion gears mesh with each other being arranged on a straight line connecting a rotation center of the output member and a rotation center of the planetary gear mechanism due to the operation of the fixing element to fix the carrier.

4. The transmission according to claim 3, wherein the fixing element comprises:

a first member attached to the member on the fixation side;

a second member attached to the carrier;

a single or a plurality of first groove portions provided in a first surface of the first member, the first surface opposing the second member;

a single or a plurality of second groove portions provided in a second surface of the second member, the second surface opposing the first surface;

an engagement element received in the single or the plurality of first groove portions or the single or the plurality of second groove portions, the engagement element having an end connected to the first member or the second member; and a biasing element to bias the engagement element in a direction that protrudes the engagement element toward the single or the plurality of first groove portions or the single or the plurality of second groove portions, the biasing element having a first end connected to the first member or the second member and a second end connected to the engagement element, wherein in a case where the second member relatively rotates in one direction with respect to the first member, the engagement element engages with the single or the plurality of first groove portions or the single or the plurality of second groove portions so as to restrict relative rotation, wherein in a case where the second member relatively rotates in another direction with respect to the first member, the engagement element is received in the single or the plurality of second groove portions or the single or the plurality of first groove portions so as to permit relative rotation, wherein at least one of the single or the plurality of first groove portions is disposed at a position that is a same as a position of the first meshing point in a rotating direction, and wherein each of the single or the plurality of second groove portions is disposed at a position that is a same as a position of a corresponding one of the plurality of pinion gears in the rotating direction.

5. The transmission according to claim 1, wherein the first gear and the second gear are respective outer and inner surfaces of the ring gear.

6. The transmission according to claim 1, wherein the fixing element is disposed on the straight line that connects the rotation center of the output member and the rotation center of the planetary gear mechanism when the carrier is fixed with the fixing element.

7. The transmission according to claim 1, wherein the first meshing point and the second meshing point are arranged at a same position in a circumferential direction of the planetary gear mechanism when the carrier is fixed with the fixing element.

8. The transmission according to claim 3, wherein the first gear and the second gear are respective outer and inner surfaces of the ring gear.

9. The transmission according to claim 3, wherein the fixing element is disposed on the straight line that connects the rotation center of the output member and the rotation center of the planetary gear mechanism when the carrier is fixed with the fixing element.

10. The transmission according to claim 3, wherein the first meshing point and the second meshing point are arranged at a same position in a circumferential direction of the planetary gear mechanism when the carrier is fixed with the fixing element.

* * * * *